Patented Dec. 5, 1944

2,364,186

UNITED STATES PATENT OFFICE 2,364,186

RUBBER-AMINE REACTION PRODUCTS

Frederick C. Bersworth, Verona, N. J., assignor to The Martin Dennis Company, Newark, N. J., a corporation of New Jersey No Drawing. Application November 22, 1941, Serial No. 420,101

13 Claims. (Cl. 260—768)

This invention relates to rubber-amine reaction products, in the form of liquids or jelly-like substances, which are miscible with or soluble in water.

The term "rubber," as used herein, includes natural rubber either as crude rubber or modified—e. g. reclaimed, vulcanized, or chlorinated—and in or made from any of the usual forms such as pale crepe, smoked sheets, or latex: and also the vulcanizable synthetic rubberlike polymers such as the chloroprene polymers, the butadiene polymers, and the organic polysulfide polymers.

The amines suitable for use in the present invention are characterized by having per molecule at least one amino nitrogen atom, each such amino nitrogen atom being attached to no other atoms than carbon and hydrogen, each such carbon atom to which the amino nitrogen is attached being non-aromatic (i. e. not part of an aromatic ring) and also being attached to no other atoms than carbon and hydrogen. Suitable amines therefore include ammonia, the alkyl amines, and also amines such as benzyl amine which although containing an aromatic group have the amino group attached to a carbon atom which is not part of the aromatic ring. Aromatic amines are excluded, by definition. So also are compounds such as urea, guanidine, and hexamethylene tetramine, as in these compounds the carbon atom to which the amino group is attached is in turn attached to other atoms besides carbon and hydrogen.

The amines which are preferred for the purposes of this invention are those having in each molecule at least two amino groups of the type above described, and wherein such amino groups are primary or secondary. Such amines therefore have per molecule at least two amino groups each of which contains at least one hydrogen atom and is attached to a different carbon atom which is not part of an aromatic ring. The most generally useful of such amines are the alkylene polyamines, including ethylene diamine, the polyethylene polyamines such as diethylene triamine, triethylene tetramine, and higher homologues, and the polymethylene diamines such as trimethylene diamine (propylene diamine) tetramethylene diamine, and higher homologues. In these latter, it is not necessary that the amino groups be at the end of the chain; thus the propylene diamine may be 1,2 diamino propane or 1,3 diamino propane. Also included are various heterocyclic polyamines falling within the foregoing definition, such as piperazine. Compounds such as p-xylylene diamine.

$$C_6H_4(CH_2NH_2)_2$$

are also included since although they contain an aromatic ring or rings there are at least two amino groups which are not directly attached to the ring.

In accordance with this invention, rubber is treated under suitable conditions with an amine of the class described, to produce a product which, at least when warm, is a liquid, readily soluble or miscible in acids, in alkalies, and in water. When cooled, this product becomes a jelly, the congealing point depending upon its particular composition (i. e. the particular rubbers and amines of which it is composed). The products of this invention are stable, at least under ordinary conditions of temperature and keeping, and their stability against heat and chemicals is of the same general order as the stability of rubber and of amines of the class described. They find use in various fields where hydrocarbon amines are employed, and may also be used alone or in combination with other substances as coating or impregnating agents or as compounding agents, or for various other purposes. They are particularly useful in the preparation of rubber products, as disclosed in copending application Serial No. 420,100, filed on Nov. 22, 1941, jointly by myself and Morris Omansky.

The preparation of products in accordance with this invention will now be described in greater detail in the following examples, which are to be understood as illustrative rather than limiting:

Example I 90 grams finely ground pale crepe is digested with 1000 grams of 60% ethylene diamine (10 mols). The ethylene diamine is in the form of an aqueous solution containing 60 parts ethylene diamine per 100 of solution. The digestion is carried out at boiling, under a reflux condenser, and with good agitation as by means of a mechanical stirrer. The rubber gradually dissolves, giving a yellowish and foaming solution. The reaction is continued for 20 hours, until about ⅔ of the rubber dissolves. Reaction is then discontinued, and the undissolved rubber is removed. The liquid portion is then distilled to remove unreacted diamine and some water. The ethylene diamine content of this liquid which is distilled off is found to be 8 mols; thus 2 mols of ethylene diamine are associated with the rubber to form the final product. This final product is in the form of a free-flowing liquid, while warm; on cooling to room temperature it sets to a jelly. This product has a pH value of 10.5, indicating that the amino groups are secondary rather than primary, and that reaction or condensation has taken place between both of the —NH$_2$ groups and the rubber component, although this explanation is not insisted upon. The final product is readily miscible with or soluble in water, and also in acids and alkalies. Thus, anhydrous HCl may be added to this reaction product, but no precipitation occurs.

The reaction may be run more nearly to completion and/or speeded up by various means, as discussed in the following examples.

Example II

Proceeding as in Example I, the reaction is continued for about four days, whereby all, or substantially all, of the rubber goes into solution. Separation of the product is carried out as in Example I.

Example III

The speed of reaction can be considerably increased by removal of more or less of the water. Thus, if dehydration is allowed to take place during the procedure of Example II—by volatilization of water from the heated reaction zone—reaction is completed in half the time, i. e. about 2 days. Alternatively, less water may be added initially, as by using say a 90% solution of ethylene diamine, or by using substantially anhydrous triethylene tetramine or other suitable polyamine. By using such substantially anhydrous polyamines, reaction time can be still further shortened, e. g. to about 1 day.

Example IV

The procedures described above may be carried out under pressure, if desired. For example, using the initial ingredients given in Example I, and reacting at 160–170° C. under a pressure of about 300 pounds per square inch, reaction is completed in about 10 hours. This time can be even further shortened by decreasing the water content as shown in the second part of Example III.

Example V

Another effective method of speeding and completing the reaction is by first kneading and working or otherwise treating the rubber to soften it and break it down—presumably resulting in appreciable depolymerization—and adding an amine of the class described at the beginning of or at some time during this step, after which the resulting rubber-amine substance is subjected to the treatment described in any of the foregoing examples. Thus, pale crepe is milled with substantially anhydrous triethylene tetramine or 60% ethylene diamine or other appropriate polyamine for about 1½ hours, whereupon the resulting mass, which is in the form of a pasty mass capable of flowing under its own weight, is transferred to a reaction vessel and there boiled as in the preceding examples in the presence of added polyamine in proper amount. Reaction can be completed in about 6 hours, or more or less according to which of the foregoing examples is followed. The amount of amine to be used during the milling step is preferably at least about 2 mols of amine per 60 grams of rubber; lesser amounts of amines can be used but with corresponding increase in time required for the second step. A considerably larger amount of amine can be used in the first step, if desired, with resulting decrease in the amount required in the second step. The amount of amine required in the second step is not critical except that there should then be present, in the rubber-amine mass plus the added amine, an excess of amine. Actually, the rubber-amine products of this invention can be produced when using only small amounts of amine, but such small amounts result in such small quantities of product as to be inefficient for commercial operations to produce the rubber-amine products of this invention.

The milling operation itself serves to form some of the rubber-amine products of this invention, the amount of such products depending upon the amount of amine present during milling, the severity of the milling, and other factors. The removal of this rubber-amine product can be accomplished, if desired, by extraction with a suitable solvent, and the product so removed, after separation from the solvent, as by distillation, exhibits the properties of the rubber-amines of this invention as already set forth.

Example VI 50 grams of reclaimed red inner tube stock is put into a closed tube together with 200 cc. of anhydrous triethylene tetramine. The closed tube is then heated at a steam pressure of 40 pounds per square inch for 4 hours. The product obtained is liquid when hot, and a jelly when cold. The red pigment (iron oxide) separates out to the bottom when standing. At least some of the sulfur originally present in the reclaim reacts during the foregoing procedure to form H$_2$S and to form sulfide of iron.

Separation of the rubber-amine reaction product from the pigment and other materials may be carried out, if desired, as by use of selective solvents, or by precipitation, or other suitable method. Such separation is not necessary when the rubber-amine reaction product is to be used in rubber compounding as described in the copending application above referred to.

Example VII

Chlorinated rubber, 66 to 68% chlorine content, is reacted with a large excess of 80% ethylene diamine, the chlorinated rubber being first dissolved in toluene in the cold. The reaction with the amine is carried out hot. There is obtained a reddish solution miscible with water to a cloudy solution. This cloudiness disappears on addition of hydrochloric acid. In addition to the reddish solution obtained, there is left as a residue an insoluble red brittle mass amounting to about 10% of the weight of the original rubber hydrochloride. This mass may be discarded.

Example VIII

"Neoprene," a chloroprene polymer, is reacted hot with excess ethylene diamine preferably of at least 60% concentration. The resulting solution is of a greenish opalescent color when hot, yellowish red and viscous when cold. Only about one-third of the "Neoprene" is reacted by this procedure to give the liquid product.

The reaction can be made to go much further or even wholly to completion by first dissolving the "Neoprene" in a suitable solvent such as ethylene dichloride or benzol.

The excess amine, water, and the solvent if used, may be removed from the product by distillation.

Example IX

Of the synthetic rubbers, those of the organic polysulfide type, e. g. "Thiokol," react the most readily with amines, in that the reaction may be carried substantially to completion (i. e. no unreacted rubber) without the use of added solvents. When "Thiokol" is boiled with an excess of amine, e. g. ethylene diamine of at least 60% concentration, a gelatinous deep red liquid is produced, and some $H_2S$ and free sulfur are evolved. Filtration removes most of this sulfur and any residue. Water and excess amine may be removed by distillation.

Example X 80 grams pale crepe, finely ground, is boiled under 50 pounds per square inch pressure for 24 hours with 1000 cc. of 26% ammonia. About 40–45 grams of gummy residue (unreacted or partly reacted rubber) remains; the balance of the rubber is in solution in the water as rubber amine. Water is removed to whatever degree desired by distillation. There is little excess ammonia; only faint odors of it are noticed in the water vapor as the latter is distilled off. A larger proportion of ammonia, and a higher concentration thereof (obtainable e. g. by addition of gaseous ammonia) effect conversion of a larger amount of the rubber to rubber amine. The rubber amine of this example is, like those of preceding examples, water-soluble.

Solvents for the natural rubber, e. g. benzol, may be used to promote the reaction, just as they are used in the treatment of the synthetic rubbers as described in some of the foregoing examples. These solvents are presumably effective because the dissolved rubber, being in liquid phase, is more readily reacted than is rubber in solid phase.

While the use of an excess of the amine is preferred in carrying out the process of this invention, such an excess, as already indicated, need not be as high as that given in Example I. The ratio of amine to rubber in Example VI is much lower than that in Example I; however, the amine in Example VI has four amino groups and conceivably all four may enter into reaction with the rubber, so that less of the amine may be required in that case to react with all of the rubber. By "excess of amine" is meant simply an excess over the amount which combines with the rubber to form the final rubber-amine reaction products of this invention. Failure to use an excess of amine, as already pointed out, does not make the process inoperative, but merely results in less complete conversion of the rubber to rubber amine under any given set of operating conditions.

I claim:

1. The process which comprises heating together, to a temperature of at least the boiling point, natural rubber and an organic amine having in each molecule at least one amino nitrogen atom, each such amino nitrogen atom being attached to no other atoms than carbon and hydrogen, each such carbon atom to which the amino nitrogen is attached being non-aromatic and also being attached to no other atoms than carbon and hydrogen, until said rubber is reacted to form a water-miscible liquid product, said amine being originally present in the ratio of at least 2 mols thereof to each 60 grams of said rubber.

2. The process which comprises heating together to a temperature of at least the boiling point a natural rubber and an amine having per molecule more than one amino group each of which contains at least one hydrogen atom and is attached to a different carbon atom which is not part of an aromatic ring nucleus, until the rubber is reacted to form a water-miscible liquid product, said amine being originally present in the ratio of at least 2 mols thereof to each 60 grams of said natural rubber.

3. The process which comprises heating together under superatmospheric pressure, to a temperature of at least the boiling point of the amine at atmospheric pressure, rubber and an organic amine having in each molecule at least one amino nitrogen atom, each such amino nitrogen atom being attached to no other atoms than carbon and hydrogen, each such carbon atom to which the amino nitrogen is attached being non-aromatic and also being attached to no other atoms than carbon and hydrogen, until substantially all the rubber has reacted into the form of a rubber-amine reaction product which is liquid at least when hot and which is miscible with water, said amine being originally present in the ratio of at least 2 mols thereof to each 60 grams of said rubber.

4. The process which comprises heating together to a temperature of at least the boiling point a natural rubber and an amine having at least two amino groups, each such amino group containing at least one hydrogen atom and being attached to a different carbon atom which is not part of an aromatic ring structure, the rubber and amine being present in the ratio of at least 2 mols of amine to each 60 grams of rubber, to produce a water-miscible product.

5. The process of claim 4 in which the reaction is carried out under substantially anhydrous conditions.

6. The process which comprises milling together a natural rubber and an amine to form a pasty mass, and the heating to at least the boiling point said mass with sufficient additional amine to constitute at least 2 mols of total amine to each 60 grams of rubber present, to form a water-soluble rubber-amine product; the said amines being characterized by containing at least two amino groups each such amino group containing at least one hydrogen atom and being attached to a different carbon atom which is not part of an aromatic ring structure.

7. The process of claim 6 in which the amines are alkylene polyamines.

8. The product obtained by heating together to a temperature of at least the boiling point natural rubber and an alkylene amine having two —$NH_2$ groups, said product being liquid when heated and a jelly when cold, and having a pH value in the order of 10.5, and being soluble in water, in acids, and in alkalies and further characterized by containing approximately 2 mols of said amine per 60 grams of said rubber.

9. The product obtained by heating together to a temperature of at least the boiling point natural rubber and an alkylene polyamine, said product being characterized by containing approximately two mols of the polyamine per 60 grams of rubber, and being soluble in water.

10. The product obtained by heating together to a temperature of at least the boiling point, natural rubber and an organic amine having in each molecule at least one amino nitrogen atom, each such amino nitrogen atom being attached to no other atoms than carbon and hydrogen, each such carbon atom to which the amino nitrogen is attached being non-aromatic and also being attached to no other atoms than carbon and hydrogen, said product being liquid when heated and a jelly when cold, and having a pH value in the order of 10.5, and being soluble in water, in acids, and in alkalies, and further characterized by containing approximately 2 mols of said amine per 60 grams of said rubber.

11. The product obtained by heating together to a temperature of at least the boiling point a natural rubber and an amine having per molecule more than one amino group each of which contains at least one hydrogen atom and is attached to a different carbon atom which is not a part of an aromatic ring nucleus, said product being liquid when heated and a jelly when cold, and having a pH value in the order of 10.5 and being soluble in water, in acids, and in alkalies, and further characterized by containing approximately 2 mols of said amine per 60 grams of said rubber.

12. The product obtained by heating together under superatmospheric pressure, to a temperature of at least the boiling point of the amine at atmospheric pressure, rubber and an organic amine having in each molecule at least one amino nitrogen atom, each such amino nitrogen atom being attached to no other atoms than carbon and hydrogen, each such carbon atom to which the amino nitrogen is attached being non-aromatic and also being attached to no other atoms than carbon and hydrogen, said product being liquid when heated and a jelly when cold, and having a pH value in the order of 10.5, and being soluble in water, in acids, and in alkalies, and further characterized by containing approximately 2 mols of said amine per 60 grams of said rubber.

13. The product obtained by milling together natural rubber and an amine to form a pasty mass, and heating to at least the boiling point said mass with sufficient additional amine to constitute at least 2 mols of total amine to each 60 grams of rubber present, said amines being characterized by being organic amines having in each molecule at least one amino nitrogen atom, each such amino nitrogen atom being attached to no other atom than carbon and hydrogen, each such carbon atom to which the amino nitrogen is attached being non-aromatic and also being attached to no other atoms than carbon and hydrogen, said product being liquid when heated and a jelly when cold, and having a pH value in the order of 10.5, and being soluble in water, in acids, and in alkalies.

FREDERICK C. BERSWORTH.